(12) United States Patent
MacDonald

(10) Patent No.: US 12,742,415 B2
(45) Date of Patent: Sep. 22, 2026

(54) MIXTURE SEPARATION IN BOTTOMING CYCLE

(71) Applicant: RTX CORPORATION, Farmington, CT (US)

(72) Inventor: Malcolm P. MacDonald, Bloomfield, CT (US)

(73) Assignee: RTX CORPORATION, Farmington, CT (US)

( * ) Notice: Subject to any disclaimer, the term of this patent is extended or adjusted under 35 U.S.C. 154(b) by 45 days.

(21) Appl. No.: 19/039,926

(22) Filed: Jan. 29, 2025

(65) Prior Publication Data

US 2026/0218653 A1 Jul. 30, 2026

(51) Int. Cl.
*F02C 6/18* (2006.01)
*F01D 15/10* (2006.01)

(52) U.S. Cl.
CPC ................ *F02C 6/18* (2013.01); *F01D 15/10* (2013.01); *F05D 2220/62* (2013.01); *F05D 2220/76* (2013.01)

(58) Field of Classification Search
CPC .. F02C 7/224; F02C 1/10; F02C 7/141; F02C 6/18; F05D 2220/323; F05D 2260/213; F05D 2220/62; F05D 2220/76; F01D 15/10
See application file for complete search history.

(56) References Cited

U.S. PATENT DOCUMENTS 12,104,535 B2 * 10/2024 Natsui ...................... F02C 7/18
2015/0000298 A1 1/2015 McAlister
2024/0328358 A1 10/2024 Barth

* cited by examiner

*Primary Examiner* — Rodolphe Andre Chabreyrie
(74) *Attorney, Agent, or Firm* — Carlson, Gaskey & Olds, P.C.

(57) ABSTRACT

An aircraft propulsion system includes a core engine, a propulsive fan, and a bottoming cycle that includes a working fluid mixture within a closed circuit that is heated and expanded through a bottom turbine to generate shaft power. The working fluid mixture includes a proportion of at least two fluids having different properties that is adjustable to change a capability of the working fluid mixture at different bottoming cycle operating points. The bottom cycle includes a reactor assembly configured to generate a reaction with one of the at least two fluids for adjusting the proportion of the at least two fluids of the working fluid mixture.

20 Claims, 4 Drawing Sheets

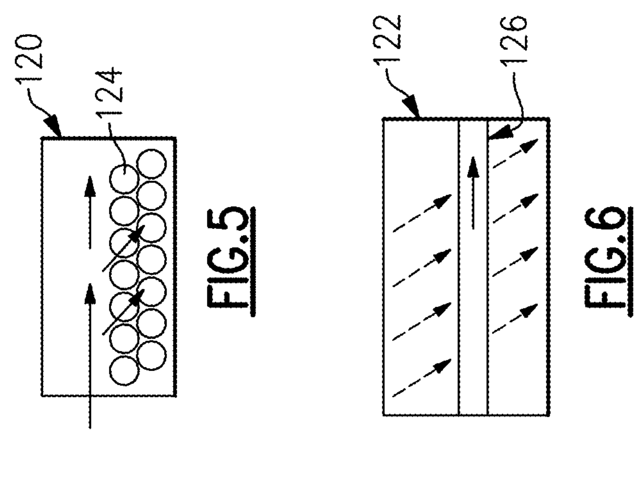
120
124
FIG.5
122
126
FIG.6
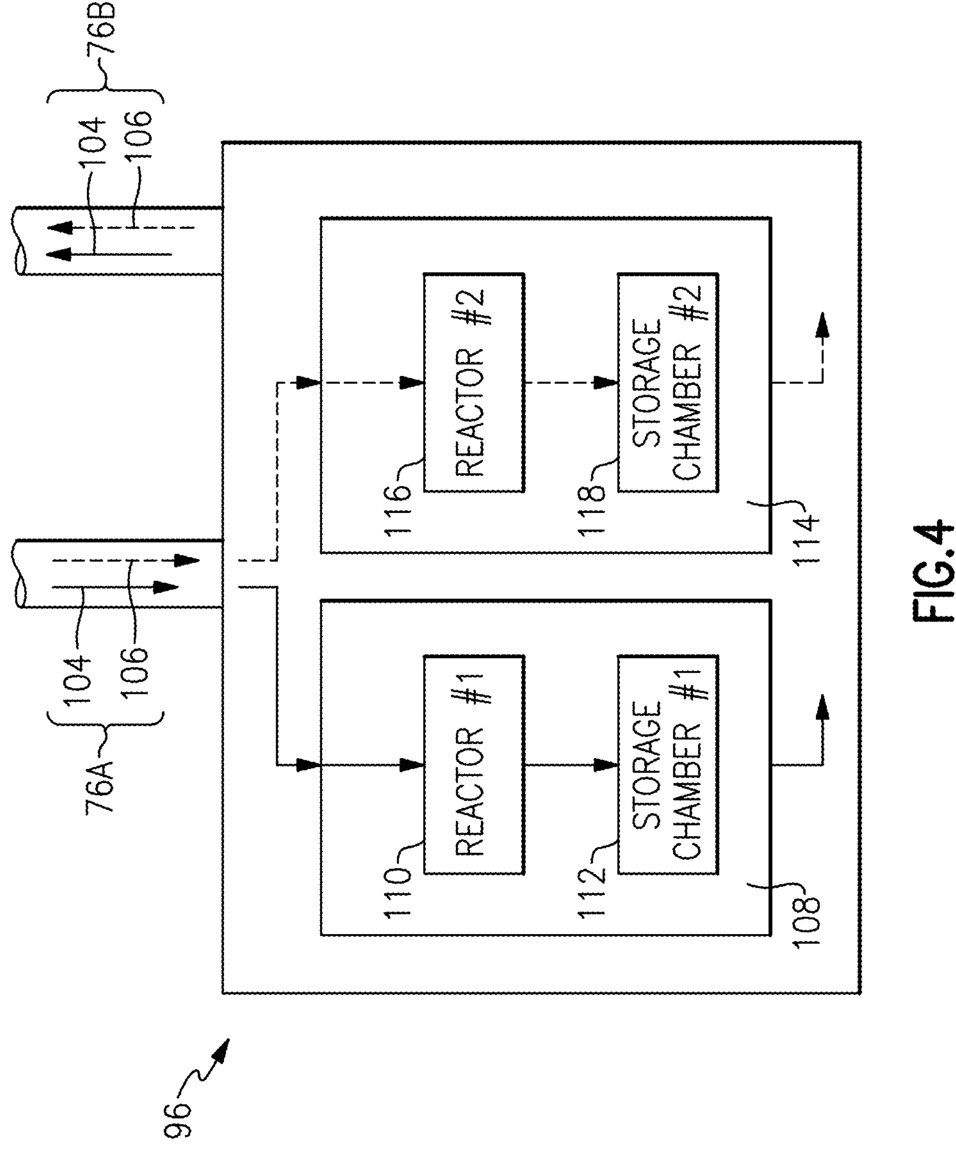
76B
104
106
76A
104
106
REACTOR #2
STORAGE CHAMBER #2
116
118
114
REACTOR #1
STORAGE CHAMBER #1
110
112
108
96
FIG.4

MIXTURE SEPARATION IN BOTTOMING CYCLE

TECHNICAL FIELD

The present disclosure relates generally to a bottom cycle for an aircraft propulsion system and more specifically to a bottoming cycle with a working fluid mixture that is adaptable to engine operating conditions to optimize recapture of thermal energy.

BACKGROUND

Turbine engines typically include a compressor where inlet air is compressed and delivered into a combustor. In the combustor, the compressed air is mixed with fuel and ignited to generate an exhaust gas flow. The exhaust flow is expanded through a turbine section to generate shaft power used to drive the compressor and a propulsive fan.

Some energy in the high energy exhaust flow is recovered as it is expanded through a turbine section. However, a large amount of energy in the form of heat is simply exhausted from the turbine section to the atmosphere. A bottoming cycle utilizes reclaimed heat to generate additional useful work. A working fluid in the bottoming cycle is heated to drive a secondary turbine to generate additional shaft power. The working fluid in the bottoming cycle is then cooled, compressed, and reheated before expansion back through the secondary turbine.

The capability of the working fluid to accept heat limits energy recovery of the bottoming cycle. Moreover, different working fluid mixtures may work better at different operating conditions. Turbine engine manufacturers continue to seek further improvements to engine performance including improvements to thermal, transfer and propulsive efficiencies.

SUMMARY

An aircraft propulsion system according to an exemplary embodiment of this disclosure, among other possible things includes a core engine that includes a main compressor where an inlet airflow is compressed and communicated to a combustor to generate an exhaust gas flow that is expanded through a main turbine section to generate power used to drive the main compressor and a propulsive fan, a bottoming cycle that includes a working fluid mixture within a closed circuit that is heated and expanded through a bottom turbine to generate shaft power, the working fluid mixture includes a proportion of at least two fluids having different properties that is adjustable to change a capability of the working fluid mixture at different bottoming cycle operating points, a first heat exchanger that is configured to input heat into the working fluid mixture, and a reactor assembly that is configured to generate a reaction with a select one of the at least two fluids for adjusting the proportion of the at least two fluids of the working fluid mixture.

In a further embodiment of the foregoing aircraft propulsion system, the first heat exchanger communicates thermal energy from the exhaust gas flow into the working fluid mixture.

In a further embodiment of any of the foregoing aircraft propulsion systems, the reactor assembly includes a first reactor for generating a reaction with a first one of the at least two fluids and a second reactor for generating a reaction with a second one of the at least two fluids.

In a further embodiment of any of the foregoing aircraft propulsion systems, the reactor assembly includes a pebble bed reactor.

In a further embodiment of any of the foregoing aircraft propulsion systems, the reactor assembly includes an absorption reactor.

In a further embodiment of any of the foregoing aircraft propulsion systems, the reactor assembly further includes a storage chamber for storing the select one of the at least two fluids in a location outside of circulation within the closed circuit.

In a further embodiment of any of the foregoing, the aircraft propulsion system further includes a controller for operating the reactor assembly and a valve system. The controller is programmed to operate the valve system to communicate the working fluid mixture to the reactor assembly to adjust the proportion of the at least two fluids of the working fluid mixture.

In a further embodiment of any of the foregoing aircraft propulsion systems, the controller is programmed to operate the valve system based on an engine operating system to communicate the working fluid mixture to the reactor assembly to adjust the proportion of the at least two fluids of the working fluid mixture.

In a further embodiment of any of the foregoing aircraft propulsion systems, the controller is programmed to operate the valve system based on a predefined phase of flight.

In a further embodiment of any of the foregoing aircraft propulsion systems, the bottoming cycle further includes a bottom compressor where working fluid is compressed prior to heating and a generator driven by the bottom turbine.

In a further embodiment of any of the foregoing aircraft propulsion systems, the bottoming cycle further includes a bottom heat exchanger where the working fluid mixture is cooled before being pressurized in the bottom compressor.

A bottoming cycle for an aircraft propulsion system according to another exemplary embodiment of this disclosure, among other possible things includes a closed fluid circuit for circulation of a working fluid mixture, the working fluid mixture includes a proportion of at least two fluids that have different properties that is adjustable to change a capability of the working fluid mixture at different bottoming cycle operating points, a heat exchanger is configured to input heat from the exhaust gas flow into the working fluid mixture, a bottom turbine is configured to generate shaft power from expansion of the working fluid mixture, a reactor assembly is configured to generate a reaction with a select one of the at least two fluids for adjusting a proportion of the at least two fluids of the working fluid mixture, a valve system for controlling a flow of the working fluid mixture to the reactor assembly, and a controller that is programmed to operate the reactor assembly and the valve assembly to adjust the proportion of the at least two fluids of the working fluid mixture based on a phase of flight.

In a further embodiment of the foregoing bottoming cycle, the reactor assembly includes a first reactor for generating a reaction with a first one of the at least two fluids and a second reactor for generating a reaction with a second one of the at least two fluids.

In a further embodiment of any of the foregoing bottoming cycles, each of the first reactor and the second reactor further includes a pebble bed reactor or an absorption reactor.

In a further embodiment of any of the foregoing bottoming cycles, each of the reactor assembly further includes at least one storage chamber for storing the select one of the at least two fluids in a location outside of circulation within the closed circuit.

In a further embodiment of any of the foregoing bottoming cycles, the controller is further programmed to operate the valve system based on an engine operating system to communicate the working fluid mixture to the reactor assembly to adjust the proportion of the at least two fluids of the working fluid mixture.

In a further embodiment of any of the foregoing bottoming cycles, the bottoming cycle further includes a bottom compressor where working fluid is compressed prior to heating and a generator that is driven by the bottom turbine and a bottom heat exchanger where the working fluid mixture is cooled before being pressurized in the bottom compressor.

A method of operating a bottoming cycle of an aircraft propulsion system according to an exemplary embodiment of this disclosure, among other possible things includes heating a working fluid mixture comprised of at least two fluids that have different properties and circulate the heated working fluid mixture within a closed circuit, expanding the heating working fluid mixture through a bottom turbine to generate shaft power, and reacting at least one of the at least two fluids in a reactor assembly to adjust a proportion of the at least two fluids of the working fluid mixture to change a capability of the working fluid mixture to extract work at different bottoming cycle operating points.

In a further embodiment of the foregoing, the method further includes reacting at least one of the at least two fluids in the reactor assembly in response to a predefined phase of flight.

In a further embodiment of any of the foregoing, the method further includes removing at least a portion of at least one of the at least two fluids of the working fluid mixture from the closed circuit to adjust the proportion of the working fluid mixture.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 4 is a simplified view of an example reactor of the example bottoming cycle embodiment.

FIG. 5 is a schematic view of an example reactor embodiment.

FIG. 6 is a schematic view of another example reactor embodiment.

DETAILED DESCRIPTION

Figure 1:
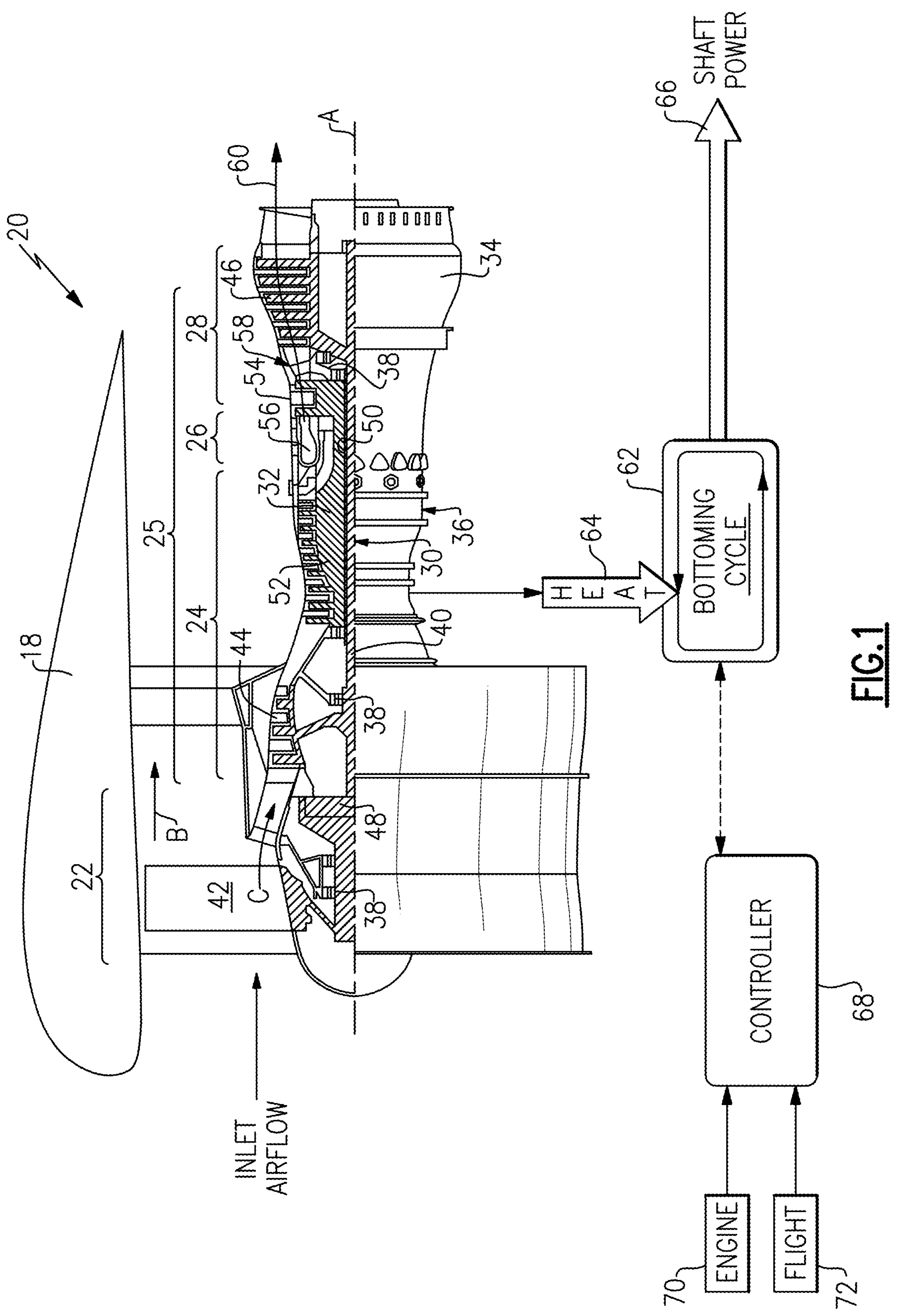
FIG. 1 is a schematic view of an example aircraft propulsion system including a bottoming cycle.

FIG. 1 schematically illustrates an aircraft propulsion system 20 including a core engine 25 and a bottoming cycle 62. Heat 64 generated in the core engine 25 is used by the bottoming cycle 62 to generate shaft power 66. The bottoming cycle 62 includes a working fluid mixture that absorbs thermal energy from the heat 64 generated in the core engine 25. The composition of the working fluid mixture is adaptable to tailor operation of the bottoming cycle 62 to current flight or engine operating conditions. A controller 68 is programmed to adjust the composition of the working fluid mixture based on information indicative of operating condition including, among other things, engine operation 70 and flight conditions 72.

The example propulsion system 20 is disclosed as a two-spool turbofan that generally incorporates a fan section 22 driven by the core engine 25. The core engine 25 includes a compressor section 24, a combustor section 26, and a turbine section 28. The core engine 25 generates an exhaust gas flow 60 that is expanded through the turbine section 28. The turbine section 28 is configured to drive the fan section 22 and the compressor section 24. The fan section 22 may include a single-stage fan having a plurality of fan blades 42. The fan blades 42 may have a fixed stagger angle or may have a variable pitch to direct incoming airflow from an engine inlet. The fan 22 drives air along a bypass flow path B defined within a nacelle 18, and also drives air along a core flow path C for compression and communication into the combustor section 26 then expansion through the turbine section 28. Exhaust gas flow 60 is finally exhausted through a nozzle 34.

The exemplary core engine 25 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner engine shaft 40 that interconnects, a first (or low) pressure compressor 44 and a first (or low) pressure turbine 46. The inner engine shaft 40 is connected to the fan section 22 through a speed change mechanism, which in one example is illustrated as a geared architecture 48 to drive the fan section 22 at a lower speed than the low speed spool 30. The inner engine shaft 40 may interconnect the low pressure compressor 44 and low pressure turbine 46 such that the low pressure compressor 44 and low pressure turbine 46 are rotatable at a common speed and in a common direction. Although this application discloses geared architecture 48, its teaching may benefit direct drive engines having no geared architecture.

The high speed spool 32 includes an outer engine shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner engine shaft 40 and the outer engine shaft 50 are concentric and rotate via bearing systems 38 about the engine central longitudinal axis A which is collinear with their longitudinal axes.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

Figure 2:
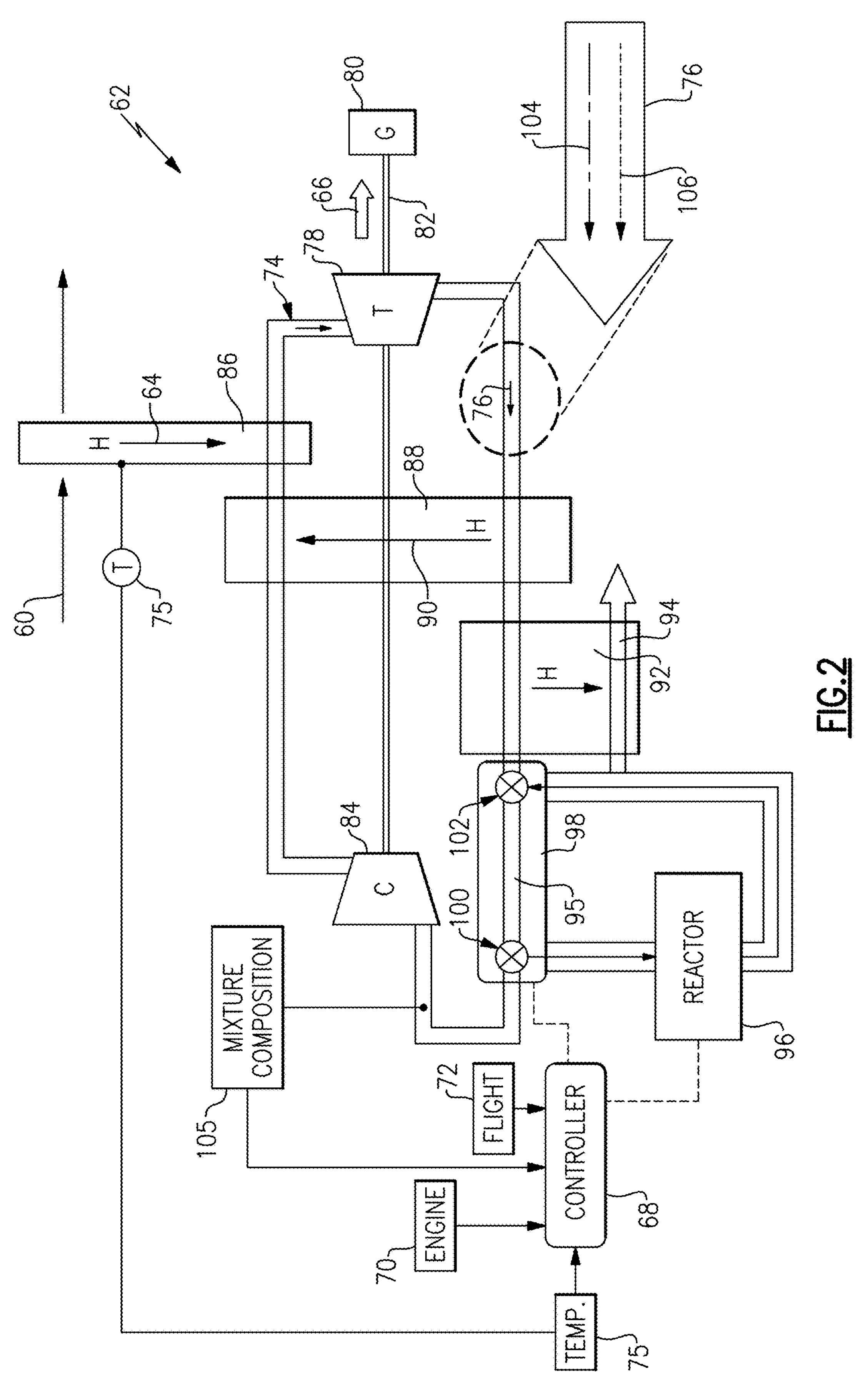
FIG. 2 is a simplified view of an example bottoming cycle embodiment.

Referring to FIG. 2, with continued reference to FIG. 1, the example bottoming cycle 62 uses a working fluid mixture 76 that circulates within a closed circuit 74. In one example embodiment, the working fluid mixture 76 absorbs heat 64 from the exhaust gas flow 60 within an exhaust heat exchanger 86. The heated working fluid mixture 76 is then expanded through a bottom turbine 78 to generate shaft power 66. In one example embodiment, the bottom turbine 78 drives a generator 80 through a shaft 82. Although, the example bottom turbine 78 is disclosed by way of example as driving the generator 80, the bottom turbine 78 may drive other aircraft or engine accessories components and remain within the contemplation and scope of this disclosure.

The working fluid mixture 76 exhausted from the bottom turbine 78 is passed through a recuperator heat exchanger 88 to communicate heat 90 from the exhausted working fluid mixture 76 to another cooler portion of the closed circuit 74. The working fluid mixture 76 may be cooled by a cooling flow 94 within a cooling heat exchanger 92 prior to being compressed in a bottoming compressor 84. Compressed working fluid mixture 76 from the bottom compressor 84 is then heated in the heat exchangers 86 and 88 and expanded through the turbine section 78 to complete a cycle. The exhausted working fluid mixture 76 from the turbine section 78 is than cooled in the cooling heat exchanger 92.

The working fluid mixture 76 is composed of at least to species or fluids with different properties in a predefined proportion. In one example embodiment, the working fluid mixture 76 includes at least two different fluid species schematically indicated as arrows 104 and 106. The different physical properties of the fluids 104, 106, change a capability of the working fluid mixture 76 to absorb thermal energy at different engine, aircraft, and/or bottoming cycle operating points.

The different fluid species 104, 106 may be comprised of any compound or element that provides desired physical and chemical properties. For example, the working fluid mixture 76 may includes Helium and Xenon, CO2 with noble gases, or Nitrogen and Helium. Moreover, other compounds, mixtures and combinations may be utilized and are within the contemplation and scope of this disclosure.

A reactor assembly 96 is in communication with the closed circuit 74 through a valve assembly 98 that is controlled by the controller 68. The example valve assembly 98 includes a first valve 100, a second valve 102, and a bypass passage 95. The reactor assembly 96 operates to selectively remove a portion of at least one of the fluids 104, 106 from the closed circuit 74 to adjust the mixture proportion of the working fluid mixture 76. The removed portion of the at least two fluids 104, 106 is stored for reuse when further adjustments are desired to the working fluid mixture 76. The controller 68 is programmed to operate the valve system 98 based on information indicative of engine operation, flight conditions, a combination of the two, along with any other information that may be useful in determining the desirability of adjusting the power recovery capacity of the bottoming cycle 62.

The reactor assembly 96 is configured to generate a reaction or reactions with a select one of the at least two fluids 104, 106 to adjust a proportion of the at least two fluids 104, 106 of the working fluid mixture 76. Although the example working fluid mixture 76 is shown and described by way of example as including the two fluids 104, 106, the working fluid mixture 76 may include additional fluids or compounds that are reactive to enable adaptation of the working fluid mixture 76 to operating conditions. The working fluid mixture 76 may also include portions that are non-reactive along with the reactive fluids or compounds. The controller 68 may control the reactor assembly 96 in addition to the valve assembly 98 to control separation of the fluids 104, 106, and thereby the proportion of the composition of the working fluid mixture 76.

The example controller 68 is a device and system for performing necessary computing or calculation operations of at least the valve assembly 98 and the reactor assembly 96. The controller 68 may be specially constructed for operation of the valve assembly 98 and the reactor assembly 96, or it may comprise at least a general-purpose computer selectively activated or reconfigured by software instructions stored in a memory device. The controller 68 may further be part of full authority digital engine control (FADEC) or an electronic engine controller (EEC).

The controller is programmed to operate the valve assembly 98, the bottoming cycle 62 and the reactor assembly 96 to optimize recovery of energy and the output of power. Optimization is accomplished by adjusting the proportion of the working fluid mixture 76 in view a varying engine operating parameter, condition, and/or flight profile. In one example embodiment, a temperature of the exhaust gas flow 60 is measured and the working fluid mixture 76 adjusted to optimized based on the measured temperature of the exhaust gas flow 60. Other engine operating parameters may be utilized including other measured engine temperatures, pressure, power output, etc. Moreover, the fluid mixture may be varied based on a predefined operating profile in addition to, or independent of any measured engine operating parameter.

In one example operational embodiment, information indicative of a temperature of the exhaust gas flow 60, indicated schematically at 75, is communicated to the controller 68 and utilized in a determination of the composition of the working fluid mixture 76. The controller 68 is programmed to adjust the mixture composition proportion of the fluids 104, 106 of the working fluid mixture 76 based on the temperature of the exhaust gas flow 60. The temperature of the exhaust gas flow 60 changes during engine operation and is indicative of the amount of thermal energy recoverable in the bottoming cycle 62.

The bottoming cycle 62 initially operates with the first and second fluids 104, 106 of the working fluid mixture 76 being at an initial proportion. The initial proportion provides the desired thermal transfer and power recovery at initial operating conditions. During initial operation of the bottoming cycle 62, the working fluid mixture 76 is communicated through the bypass passage 95 of the valve assembly 98 such that working fluid mixture 76 is not placed in communication with the reactor assembly 96. Accordingly, in an initial operating conditions, the valve assembly 98 is arranged to pass the working fluid mixture 76 through the closed circuit 74 without communication through the reactor assembly 96.

In another example embodiment, the valve assembly 98 may be arranged to pass all of the working fluid mixture 76 through the reactor assembly 96. In such an arrangement, the reactor assembly 96 may be inactive such that the working fluid mixture 76 is not altered. The configuration and operation of the reactor assembly 96 would determine whether the working fluid mixture 76 is bypassed around or allowed to flow through during operational periods where modification of the working fluid mixture 76 is not desired.

Figure 3:
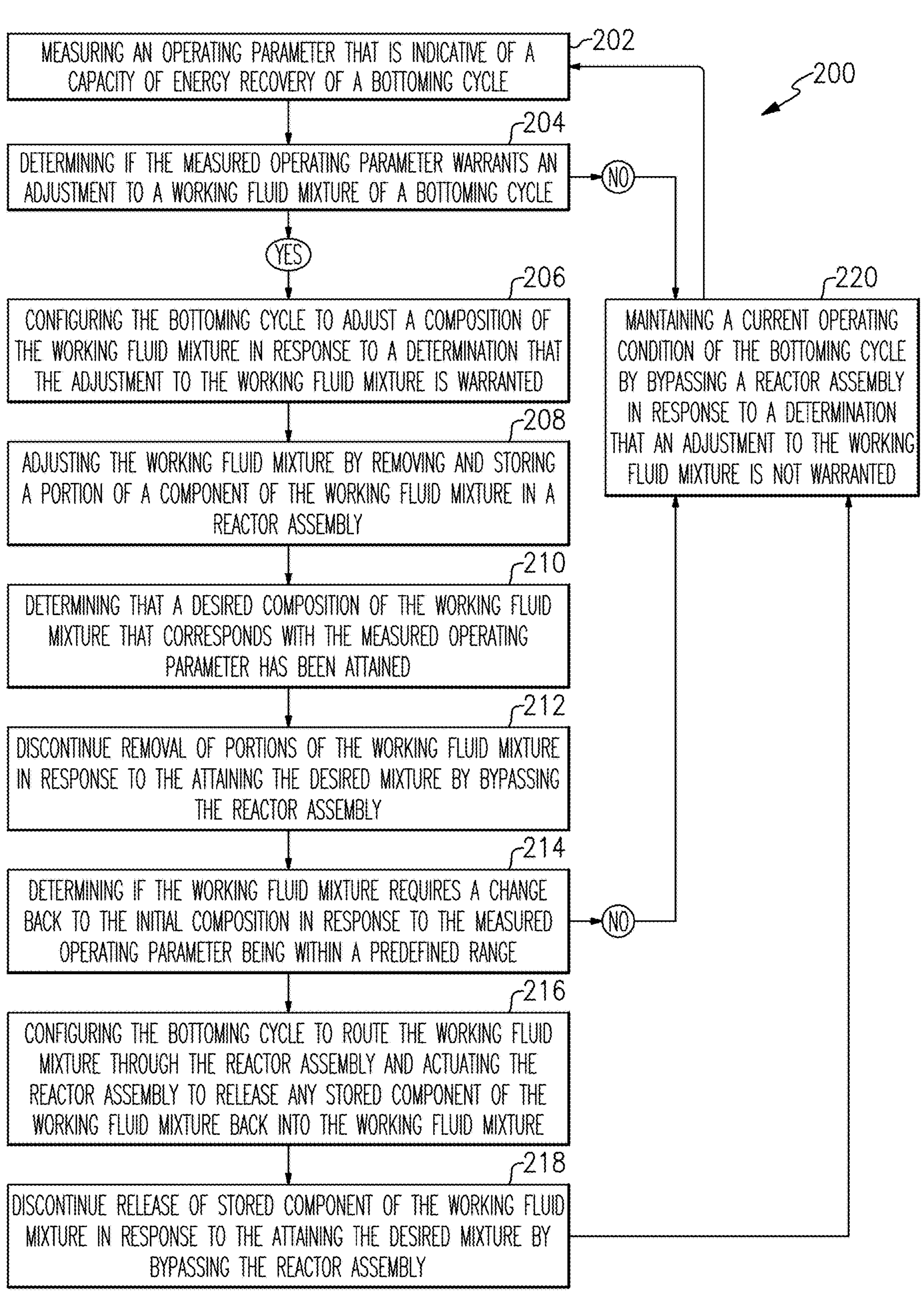
FIG. 3 is a schematic representation of an example process for adjusting a composition of a working fluid mixture.

Referring to FIG. 3, with continued reference to FIG. 2, example process steps in an operational embodiment is schematically shown and indicated at 200. Measurement of an operation parameter that is indicative of a capacity of energy recovery of the bottoming cycle is continually gathered and communicated to the controller as indicated at 202. In the example embodiment, the controller 68, the temperature 75 of the exhaust gas flow 60 is used to make this determination. The controller 68 may also continually receive information indicative of a measured parameter and of a composition of the working fluid mixture 76. In one example embodiment, information indicative of the mixture composition is provided by a sensor schematically indicated at 105. The mixture composition sensor 105 measures a parameter of the working fluid mixture 76 that is indicative of a proportion of first fluid 104 and the second fluid 106. The parameter may be a relative temperature, pressure or some other characteristic that changes based on the changes in the composition of the working fluid mixture.

In response to a changes in engine operation that are reflected in changes to the exhaust gas temperature 75, the controller 68 determines if a change in the composition of the working fluid mixture 76 is warranted as is indicated at 204. Should no change be warranted, the current operation of the bottoming cycle 62 is maintained to bypass the working fluid mixture 76 around the reactor assembly as is indicated at 220.

Should the determination be that a change in the working fluid mixture 76 is warranted, the controller 68 configures features of the bottoming cycle 62 to adjust the composition as indicated at 206. In one example embodiment, the configuration of the bottoming cycle 62 includes routing the working fluid mixture 76 through the reactor assembly 96. In the reactor assembly 96, a portion of the working fluid mixture 76 is removed and stored as is indicated at 208.

The controller 68 further determines the desired proportion of the first fluid 104 and the second fluid 106 that corresponds to the measured temperature 75 of the exhaust gas flow 60. The controller 68 is programmed to determine the proportion of the first fluid 104 and the second fluid 106 that corresponds to the given temperature of the exhaust gas flow 60 as is indicated at 210. The controller 68 is further programmed to actuate the valve assembly 98 and the reactor assembly 96 to obtain the proportion of the working fluid mixture 76 that corresponds to the exhaust gas flow temperature 75.

A change in the working fluid mixture 76 proceeds by arranging the valves 100 and 102 of the valve assembly 98 to direct the working fluid mixture 76 through the reactor assembly 96. The reactor assembly 96 may operate to remove a portion of either of the first fluid 104 and the second fluid 106 such that the working fluid mixture 76 communicated back into the closed circuit 74 is of a different proportion. The working fluid mixture 76 will be directed through the reactor assembly 96 until the mixture is adjusted to a desired proportion.

Verification that the working fluid mixture 76 has reached the desired proportion may be provided based on information on the mixture composition sensor 105. Verification may also be based on other factors including a predetermined time or another measurable performance parameter of the bottoming cycle 62.

The reactor assembly 96 may operate to remove some portion of one of the first and second fluids 104, 106 using a chemical process that does not require external power input or heating. In one example embodiment, the reactor assembly 96 is configured to absorb a portion of one of the first fluid 104 and the second fluid 106 when placed in contact. Moreover, in one example embodiment, the reactor assembly 96 may be configured to release absorbed portions when heated.

Once the working fluid mixture 76 is adjusted to the desired proportion, the controller 68 will arrange the valve assembly 98 to bypass the reactor assembly 96 and circulate through the closed circuit 74 to generate shaft power to drive the generator 80. Accordingly, once the desired portion is obtained, removal and storage of a portion of the working fluid mixture 76 is discontinued as is indicated at 212. This is accomplished in this example embodiment by bypassing the reactor assembly 96. The bottoming cycle 62 will operate with the adjusted working fluid flow until the parameter that triggers adjustment changes sufficiently to trigger another adjustment. Accordingly, the controller continues to monitor the measured parameter and determine if a change back to the initial composition is warranted as is indicated at 214. If the measured parameter indicates that changes are not needed, the bottoming cycle 62 is maintained in a configuration that bypasses the reactor assembly as is indicated at 220.

In response to a determination that a change back to the initial composition of the working fluid mixture 76 is warranted, the bottoming cycle 62 is configured to route the working fluid mixture 76 back through the reactor assembly 96 as is indicated at 216. In one example embodiment, when the temperature of the exhaust gas flow 60 changes to fall within the initial temperature levels, the controller 68 actuates the valve assembly 98 and the reactor assembly 96 to further adjust the composition of the working fluid mixture 76. In one example embodiment, the adjustment includes returning the working fluid mixture 76 back to the initial proportions by releasing any trapped portions of the first working fluid 104 or the second working fluid 106 from the reactor assembly 96. In one example embodiment, release of any trapped portions is accomplished by heating the trapped portions to desorb fluid back into the working fluid mixture 76.

Once the working fluid mixture 76 is reaches the desired compositions, release of the stored components from the reactor assembly 96 is discontinued as indicated at 216. Release is discontinued in one example embodiment by bypassing the reactor assembly 96 as indicated at 218. The process continues with the monitoring of the operating parameter as indicated at 202.

Although an operational embodiment is disclosed and explained as an example, other means and configurations for removing and reintroducing portions of the working fluid mixture 76 into the closed circuit 74 could be utilized and are within the contemplation of this disclosure. The composition of the working fluid mixture 76 along with the type of reactor is needed and utilized would change operation from the example embodiment and are within the contemplation and scope of this disclosure.

Referring to FIG. 4 with continued reference to FIGS. 1 and 2, an example reactor assembly 96 embodiment is schematically shown and includes a first reactor assembly 108 and a second reactor assembly 114. The first reactor assembly 108 includes a first reactor 110 for generating a reaction with the first fluid 104 and the second reactor assembly 114 includes a second reactor 116 for generating a reaction with the second fluid 106.

The reactor assembly 96 further includes at least one storage chamber for storing some or all of the fluids 104, 106 removed from circulation within the closed circuit 74. In one example embodiment, a first storage chamber 112 is provides for holding any removed portion of the first fluid 104 and a second storage chamber 118 is provided for holding any removed portion of the second fluid 106. Although two separate storage chambers 112, 118 are shown by way of example, one storage chamber or multiple storage chambers could be utilized and are within the contemplation of this disclosure. The example storage chambers hold the removed portion of the two fluids 104, 106 in a location outside of circulation within the closed circuit 74.

The example reactors 110, 116 may be of any configuration that provides for the selective separation of one fluid or component from the working fluid mixture 76. Each reactor may include physical mechanism, chemical process or separation process that provides for the selective removal of a select one of the first and second fluids 104, 106.

Referring to FIG. 5, in one example embodiment, one of the reactors 110, 116 is a pebble bed reactor as schematically shown at 120. A pebble bed reactor includes a plurality of reactive elements 124 that are formed from an element or compound that is reactive with a designated one of the first and second fluids 104, 106. The specific compound and type of the fluid determines the type of and compound forming the reactive elements 124. Moreover, the size, shape, and number of reactive elements 124 is selected to accommodate the planned proportions of the working fluid mixture 76 to meet operating conditions.

Referring to FIG. 6, another example reactor embodiment is schematically indicated at 122. The reactor 122 is an absorption reactor that includes an absorbent element 126 selected depending on the designated one of the fluids 104, 106 of the working fluid mixture 76. The type and structure of the absorbent element 126 is tailored to the selected one of the fluids 104, 106. Moreover, the quantity and size of the absorbent element 126 and reactor 122 is determined based on the amount of fluid that is desired to be removed and reinjected into the closed circuit 74 to adjust the proportion of the working fluid mixture 76.

Although example reactors are shown and disclosed by way of example, other reactor configurations may be utilized and remain within the contemplation of this disclosure. Examples of reactors may be catalyst coated heat exchangers, packed bed reactors, pressure swing adsorption or temperature swing adsorption reactors. Moreover, the reactor may be configured to utilize differences in physical and chemical properties of the different fluids of the working fluid mixture to adjust thermal absorption and operational capabilities.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft propulsion system comprising:

a core engine comprising a main compressor where an inlet airflow is compressed and communicated to a combustor to generate an exhaust gas flow that is expanded through a main turbine section to generate power used to drive the main compressor and a propulsive fan;

a bottoming cycle comprising a working fluid mixture within a closed circuit that is heated and expanded through a bottom turbine to generate shaft power, wherein the working fluid mixture comprises a proportion of at least two fluids having different properties that is adjustable to change a capability of the working fluid mixture at different bottoming cycle operating points;

a first heat exchanger configured to input heat into the working fluid mixture; and a reactor assembly configured to generate a reaction with a select one of the at least two fluids for adjusting the proportion of the at least two fluids of the working fluid mixture.

2. The aircraft propulsion system as recited in claim 1, wherein the first heat exchanger communicates thermal energy from the exhaust gas flow into the working fluid mixture.

3. The aircraft propulsion system as recited in claim 1, wherein the reactor assembly comprises a first reactor for generating a reaction with a first one of the at least two fluids and a second reactor for generating a reaction with a second one of the at least two fluids.

4. The aircraft propulsion system as recited in claim 1, wherein the reactor assembly comprises a pebble bed reactor.

5. The aircraft propulsion system as recited in claim 1, wherein the reactor assembly comprises an absorption reactor.

6. The aircraft propulsion system as recited in claim 1, wherein the reactor assembly further comprises a storage chamber for storing the select one of the at least two fluids in a location outside of circulation within the closed circuit.

7. The aircraft propulsion system as recited in claim 1, further comprising a controller for operating the reactor assembly and a valve system, wherein the controller is programmed to operate the valve system to communicate the working fluid mixture to the reactor assembly to adjust the proportion of the at least two fluids of the working fluid mixture.

8. The aircraft propulsion system as recited in claim 7, wherein the controller is programmed to operate the valve system based on an engine operating system to communicate the working fluid mixture to the reactor assembly to adjust the proportion of the at least two fluids of the working fluid mixture.

9. The aircraft propulsion system as recited in claim 7, wherein the controller is programmed to operate the valve system based on a predefined phase of flight.

10. The aircraft propulsion system as recited in claim 1, wherein the bottoming cycle further comprises;

a bottom compressor where working fluid is compressed prior to heating; and a generator driven by the bottom turbine.

11. The aircraft propulsion system as recited in claim 10, wherein the bottoming cycle further comprises a bottom heat exchanger where the working fluid mixture is cooled before being pressurized in the bottom compressor.

12. A bottoming cycle for an aircraft propulsion system comprising:

a closed fluid circuit for circulation of a working fluid mixture, the working fluid mixture comprises a proportion of at least two fluids having different properties that is adjustable to change a capability of the working fluid mixture at different bottoming cycle operating points;

a heat exchanger configured to input heat from a combustor gas flow into the working fluid mixture;

a bottom turbine configured to generate shaft power from expansion of the working fluid mixture;

a reactor assembly configured to generate a reaction with a select one of the at least two fluids for adjusting a proportion of the at least two fluids of the working fluid mixture;

a valve system for controlling a flow of the working fluid mixture to the reactor assembly; and a controller programmed to operate the reactor assembly and the valve assembly to adjust the proportion of the at least two fluids of the working fluid mixture based on a phase of flight.

13. The bottoming cycle as recited in claim 12, wherein the reactor assembly comprises a first reactor for generating a reaction with a first one of the at least two fluids and a second reactor for generating a reaction with a second one of the at least two fluids.

14. The bottoming cycle as recited in claim 13, wherein each of the first reactor and the second reactor further comprises a pebble bed reactor or an absorption reactor.

15. The bottoming cycle as recited in claim 13, wherein the reactor assembly further comprises at least one storage chamber for storing a fluid of the at least two fluids in a location outside of circulation within the closed circuit.

16. The bottoming cycle as recited in claim 12, wherein the controller is further programmed to operate the valve system based on an engine operating system to communicate the working fluid mixture to the reactor assembly to adjust the proportion of the at least two fluids of the working fluid mixture.

17. The bottoming cycle as recited in claim 12, further comprising;

a bottom compressor where the working fluid mixture is compressed prior to heating;

a generator driven by the bottom turbine; and a bottom heat exchanger where the working fluid mixture is cooled before being pressurized in the bottom compressor.

18. A method of operating a bottoming cycle of an aircraft propulsion system comprising:

heating a working fluid mixture comprised of at least two fluids having different properties and circulating the heated working fluid mixture within a closed circuit;

expanding the heated working fluid mixture through a bottom turbine to generate shaft power; and reacting at least one of the at least two fluids in a reactor assembly to adjust a proportion of the at least two fluids of the working fluid mixture to change a capability of the working fluid mixture to extract work at different bottoming cycle operating points.

19. The method as recited in claim 18, further comprising reacting at least one of the at least two fluids in the reactor assembly in response to a measured changes in a measured operating parameter.

20. The method as recited in claim 19, further comprising removing at least a portion of at least one of the at least two fluids of the working fluid mixture from the closed circuit to adjust the proportion of the working fluid mixture.

* * * * *